US012618485B2

(12) United States Patent
Olbrich et al.

(10) Patent No.: US 12,618,485 B2
(45) Date of Patent: May 5, 2026

(54) VALVES FOR CONTROLLING FLOW OF PRESSURIZED FLUID TO A TOOL

(71) Applicant: Enerpac Tool Group Corp., Milwaukee, WI (US)

(72) Inventors: Nathaniel Olbrich, Shorewood, WI (US); Eric D. Norquist, Whitefish Bay, WI (US); Arnold Decker, Aurora, IL (US)

(73) Assignee: Enerpac Tool Group Corp., Milwaukee, WI (US)

( * ) Notice: Subject to any disclaimer, the term of this patent is extended or adjusted under 35 U.S.C. 154(b) by 64 days.

(21) Appl. No.: 18/910,525

(22) Filed: Oct. 9, 2024

(65) Prior Publication Data

US 2025/0224042 A1      Jul. 10, 2025

Related U.S. Application Data

(60) Provisional application No. 63/617,445, filed on Jan. 4, 2024.

(51) Int. Cl.
F16K 11/10 (2006.01)
*F16K 15/04* (2006.01)

(52) U.S. Cl.
CPC .......... F16K 11/105 (2013.01); *F16K 15/044* (2013.01)

(58) Field of Classification Search
CPC .. F16K 11/105; F16K 31/1221; F16K 15/044; F15B 11/15; F15B 2211/31576
See application file for complete search history.

(56) References Cited

U.S. PATENT DOCUMENTS

| | | | |
|---|---|---|---|
| 6,370,875 B1 * | 4/2002 | Decker | F04B 49/08 60/431 |
| 7,296,669 B2 | 11/2007 | Quehenberger | |
| 9,360,028 B2 | 6/2016 | Zwingler | |
| 11,215,203 B2 | 1/2022 | Trinchieri | |
| 2017/0356438 A1 | 12/2017 | Hughes | |

(Continued)

FOREIGN PATENT DOCUMENTS

EP          3078456 B1     12/2017

OTHER PUBLICATIONS

EP3078456A1 machine translation (Year: 2017).*

(Continued)

*Primary Examiner* — Michael R Reid
(74) *Attorney, Agent, or Firm* — Andrus Intellectual Property Law, LLP

(57) ABSTRACT

A valve is for controlling flow of a pressurized fluid to a tool. The valve has a manifold, a poppet biased into an unseated position in which the pressurized fluid may flow from the manifold via a tank outlet, a piston configured to move the poppet into a seated position when the pressurized fluid flows into the manifold via the manifold inlet at a first fluid pressure, and a check valve biased into a closed position in which the pressurized fluid is prevented from flowing from the manifold via the tool outlet. A retainer retains the poppet relative to the piston and is configured so that when the poppet is in the seated position, the piston is independently movable relative to the poppet and thus permits the poppet to remain in the seated position upon variations in fluid pressure in the manifold.

20 Claims, 8 Drawing Sheets

(56) References Cited

U.S. PATENT DOCUMENTS

2023/0039274 A1    2/2023  Hughes

OTHER PUBLICATIONS

Enerpac, E-Series Electric Pump Pilot Operated Dump Valve, see the entire document and particularly Figure 11A and associated descriptions. Oct. 2019.
Enerpac. "EP3104DB-G, Electric Hydraulic Pump, 0.8 gal Usable Oil, NEMA 5-15 Plug, with Gauge." Available at: https://www.enerpac.com/en-us/e-pulse-series-electric-pumps/electric-pump-high-flow/EP3104DB-G. Accessed on Oct. 9, 2024.
Enerpac. "E-Series, E-Pulse® Electric Hydraulic Pumps." Brochure available at: www.enerpac.com. Accessed on Oct. 9, 2024.
European Search Report issued in Corresponding European Patent Application No. 24219304.3, dated May 15, 2025.

* cited by examiner

1

VALVES FOR CONTROLLING FLOW OF PRESSURIZED FLUID TO A TOOL

CROSS REFERENCE TO RELATED APPLICATION

This application claims benefit of priority to U.S. Provisional Application No. 63/617,445, filed Jan. 4, 2024, which is hereby incorporated by reference in entirety.

FIELD

The present disclosure relates to valves for controlling flow of pressurized fluid to a tool.

BACKGROUND

Prior art Electric Pump Pilot Operated Dump Valves are commercially available for purchase in association with the E-Series (E-Pulse) Pumps sold by Enerpac, models EP3104DB and EP3104DB-G (100-120 VAC-NEMA 5-15 plug), EP3104DI and EP3104DI-G (200-250 VAC-NEMA 6-15 plug) and EP3104DE and EP3104DE-G (200-250 VAC-Schuko CEE 7/7 plug).

U.S. Pat Pub. 2017/0356438 is incorporated herein by reference and discloses a fluid pump system including a housing, a motor, a fan, and a fluid conduit. The housing includes a wall having a first end and a second end, and the housing defines a first axis extending between the first end and the second end. The wall extends at least partially around the first axis and at least partially encloses a chamber. The motor is at least partially positioned within the chamber. The fan is positioned proximate the first end, and the fan generates air flow through the chamber. The fluid conduit is configured to be in fluid communication with a fluid reservoir, and at least a portion of the fluid conduit is positioned within the chamber.

U.S. Pat. Pub. 2023/0039274 is incorporated herein by reference and discloses a pump having a frame including a reservoir. The reservoir stores a hydraulic fluid. The pump may also include a motor assembly supported by the frame and a pump assembly operably driven by the motor assembly. The pump assembly is in fluid communication with the reservoir and configured to dispense the hydraulic fluid out of the frame. The pump assembly includes a first piston and a second piston, wherein the first piston dispenses hydraulic fluid out of the frame between a first pressure and a second pressure greater than the first pressure, and the second piston dispenses hydraulic fluid out of the frame between the first pressure and a third pressure, the third pressure being greater than the second pressure.

SUMMARY

This Summary is provided to introduce a selection of concepts which are further described herein below in the Detailed Description. This Summary is not intended to identify key or essential features of the claimed subject matter, nor is it intended to be used as an aid in limiting scope of the claimed subject matter.

In non-limiting examples disclosed herein, a valve is provided controlling flow of a pressurized fluid to a tool. The valve comprises a manifold having a manifold inlet configured to receive the pressurized fluid from a source, a tool outlet configured to discharge the pressurized fluid to the tool, and a tank outlet configured to discharge the pressurized fluid to a tank. The valve further comprises a poppet biased into an unseated position in which the pressurized fluid may flow from the manifold via the tank outlet, the poppet being movable into a seated position in which the pressurized fluid is prevented from flowing from the manifold via the tank outlet. The valve further comprises a piston configured to move the poppet into the seated position when the pressurized fluid flows into the manifold via the manifold inlet at a first fluid pressure. The valve further comprises a check valve biased into a closed position in which the pressurized fluid is prevented from flowing from the manifold via the tool outlet, the check valve being movable into an open position in which the pressurized fluid may flow from the manifold via the tool outlet when the pressurized fluid flows into the manifold via the manifold inlet at a second fluid pressure which is greater than the first fluid pressure. The piston and poppet are coupled together so that when the poppet is in the seated position, the piston is independently movable relative to the poppet so that the poppet may remain in the seated position upon variations in fluid pressure in the manifold.

In independent examples, the valve comprises a retainer configured to retain the poppet relative to the piston so that the poppet remains in the seated position upon said variations in fluid pressure in the manifold. The retainer may be disposed in or be part of the piston. The retainer may be a separate piece from the piston and configured to move with the piston in the manifold upon said variations in fluid pressure in the manifold.

In independent examples, at least one of the retainer and the poppet define a gap which permits independent movement of the piston relative to the poppet. The poppet may comprise a flange which is slidable back and forth in a gap between the poppet and the retainer. The poppet may comprise a body having a first end configured, in the seated position, to seat in a seat on the manifold and a second end operably engaged with the retainer, wherein engagement between the first end and the seat forms a seal. The retainer may surround the second end of the poppet and further a slot may be defined between the retainer and the piston which permits movement of the piston relative to the poppet.

In independent examples, a piston spring biases the poppet into the unseated position. The piston spring may bias the piston away from the poppet when the poppet is in the seated position. In independent examples, when the pressurized fluid flows into the manifold at the first fluid pressure, the piston is moved with the poppet as the poppet moves into the seated position. The valve may be configured so that when the poppet is in the seated position and the pressurized fluid in the manifold is reduced below the first fluid pressure, the piston spring moves the piston back alongside the poppet and then into engagement with the poppet.

Independent examples may include a flange and a slot which are movable relative to each other, the flange engaging opposite ends of the slot to engage the piston with the poppet. A check valve spring may bias the check valve into the closed position. The check valve may comprise a ball valve. A piston spring may be provided for biasing the poppet into the unseated position, and a check valve spring may be provided for biasing the check valve into the closed position, wherein the piston spring and the check valve spring are coaxial. The check valve spring may be disposed in the poppet. The check valve may comprise a ball valve which in the closed position engages a seat in the piston. An orifice may be provided for permitting leakage of the pressurized fluid from the manifold.

BRIEF DESCRIPTION OF THE DRAWINGS

Embodiments are described with reference to the following drawing figures. The same numbers are used throughout to reference like features and components.

DETAILED DESCRIPTION OF THE DRAWINGS

As used herein, unless otherwise limited or defined, discussion of particular directions is provided by example only, with regard to particular embodiments or relevant illustrations. For example, discussion of "top," "bottom," "front," "rear," "left," "right," "horizontal," "vertical," and "longitudinal" features and/or relative motion, e.g., movement "up" and "down," is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally or alternatively, embodiments may be arranged in a different orientation such that "top" and "bottom" features are arranged horizontally relative to each other, for example in a "left-to-right" orientation.

During research and development, the present inventors determined that flow control valves configured to fluidically connect and control the flow of pressurized fluid (liquid or gas) between a fluid pump, a fluid reservoir, and an output device actuated by the pressurized fluid may experience leakage back to the fluid reservoir due to pressure fluctuations that occur as the fluid pump operates. Single piston pumps, for example, may not maintain a constant fluid output pressure as the fluid output slows or stops during the intake portion of the pump piston's cycle. The cyclic drop in pressure may cause known valves to periodically open and leak back to the fluid reservoir, causing an undesirable pressure drop. For this reason, the present inventors determined that known flow control valves often do not maintain consistent fluid pressure, which may reduce the efficiency and effectiveness of an output device. The present inventors thus have realized a need in the art to provide improved flow control valves that more effectively maintain a sealed fluid pathway to the fluid reservoir as the pressure of the fluid in the valve fluctuates. The present disclosure is a result of these efforts.

Figure 1:
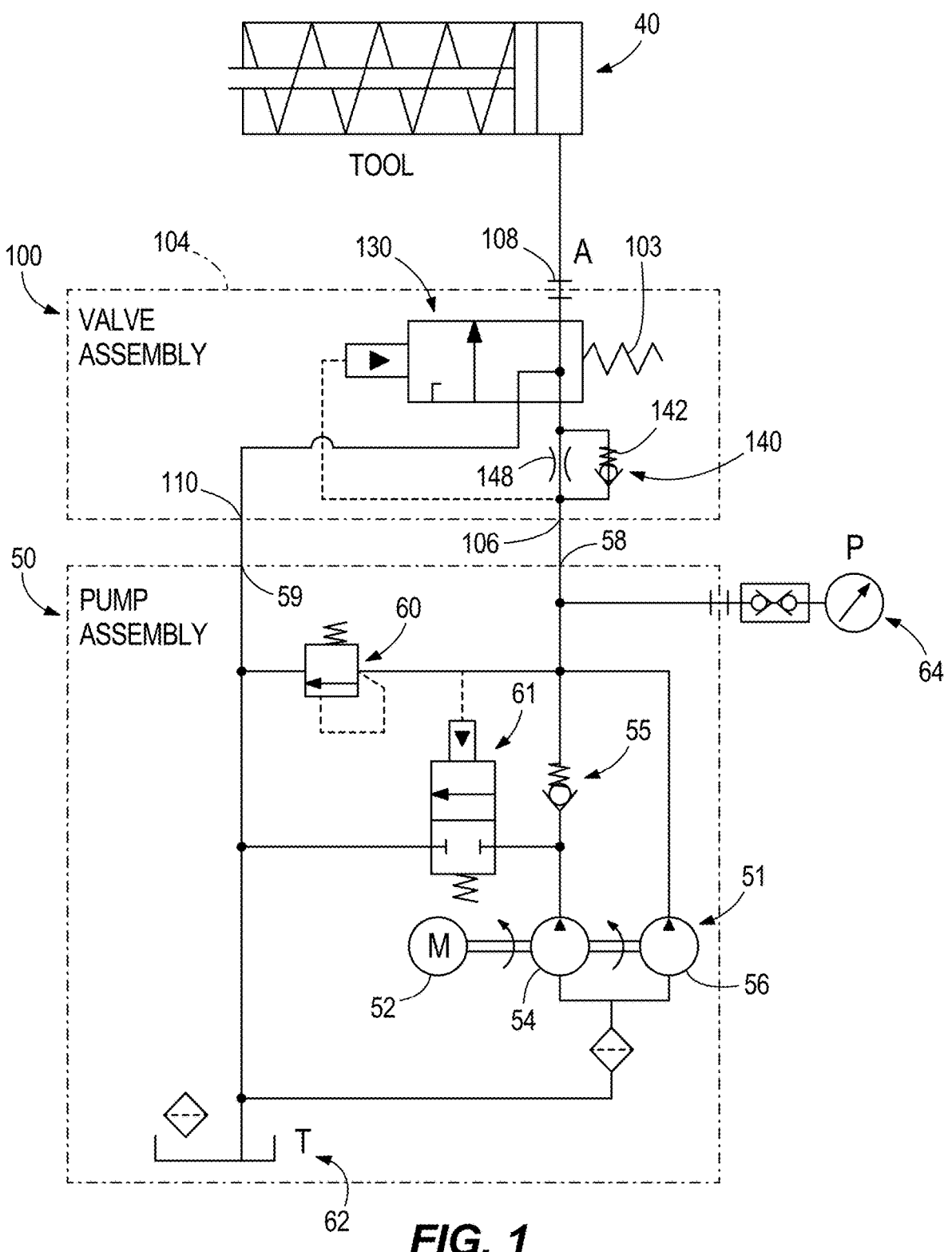
FIG. 1 is a schematic view of an embodiment of valve for controlling the flow of pressurized fluid from a pump to a tool.

FIG. 1 is a schematic view of a pump assembly 50 configured to operate a tool 40 (or other output device) and a novel valve 100 for controlling the flow of pressurized fluid from the pump assembly 50 to the tool 40. Referring to FIG. 1, the pump assembly 50 includes a pump 51 with a first pump piston 54 and a second pump piston 56 that are driven by a pump motor 52 to pump a fluid, for example an oil, gas and/or another fluid, from a tank 62 to the tool 40 via the valve 100. The type and configuration of the pump 51 may vary from what is shown and described. In the illustrated embodiment, the pump 51 is configured as a two-stage pump in which the first pump piston 54 is cammed 180 degrees relative to the second pump piston 56. The first pump piston 54 and the second pump piston 56 are used to generate an initial fluid pressure at the pump assembly outlet 58. Once the initial fluid pressure is reached, a control valve 61 is switched into an open position to redirect fluid from the first piston 54 back to the tank 62 while the second pump piston 56 continues to pump fluid to the valve 100 via the pump outlet 58. A check valve 55 prevents backflow from the second pump piston 56 back towards the first pump piston 54, and a relief valve 60 is configured to prevent the fluid pressure at the pump outlet 58 from exceeding a desired maximum pressure. The fluid pressure at the pump assembly outlet 58 may be monitored by a pressure sensor 64. The pump assembly 50 also includes a pump return inlet 59 through which fluid is returned to the tank 62 from the valve 100 and/or any other fluid pathway configured to return fluid to the tank 62.

Figure 2:
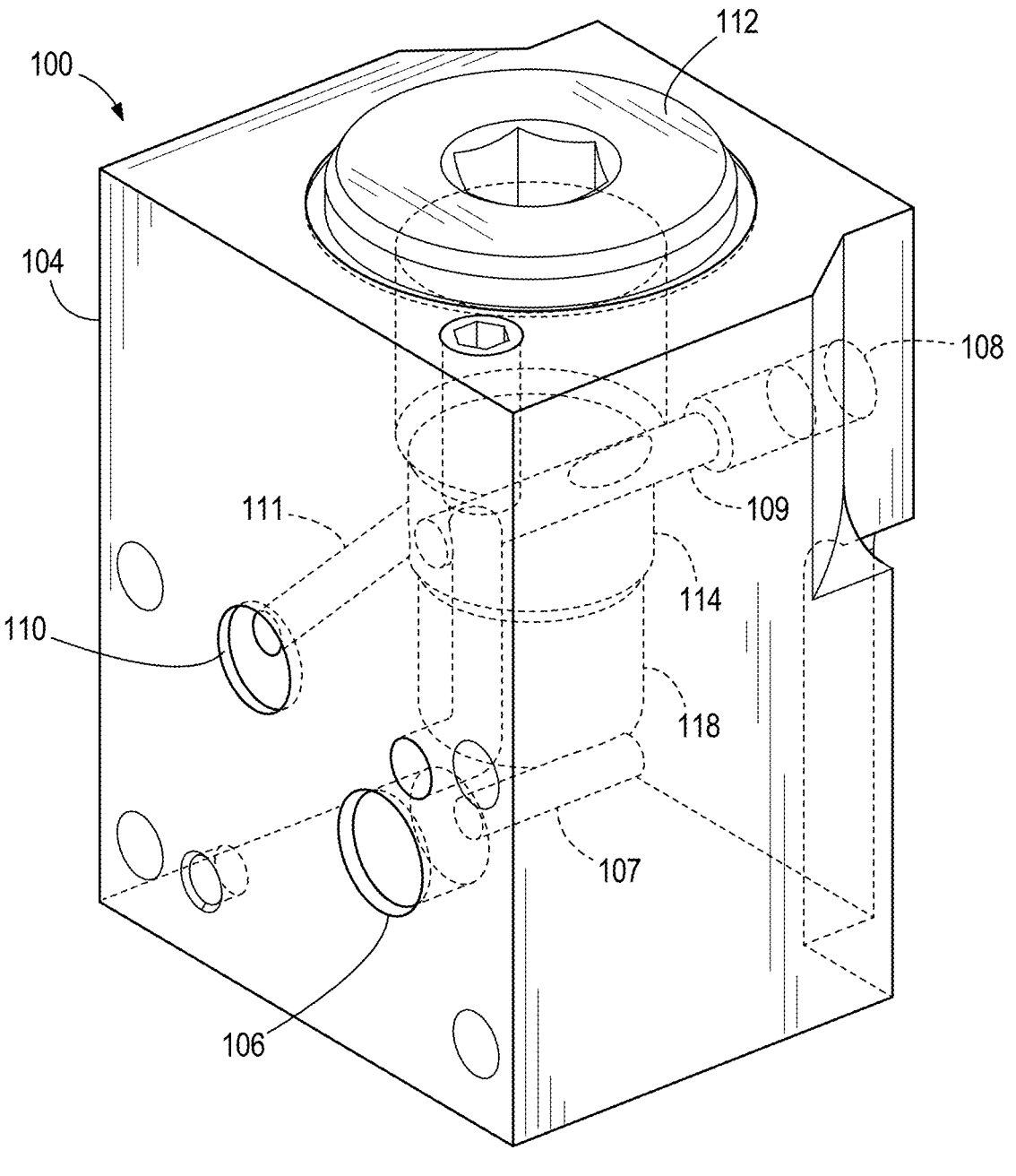
FIG. 2 is a perspective view of the valve of FIG. 1.
Figure 3:
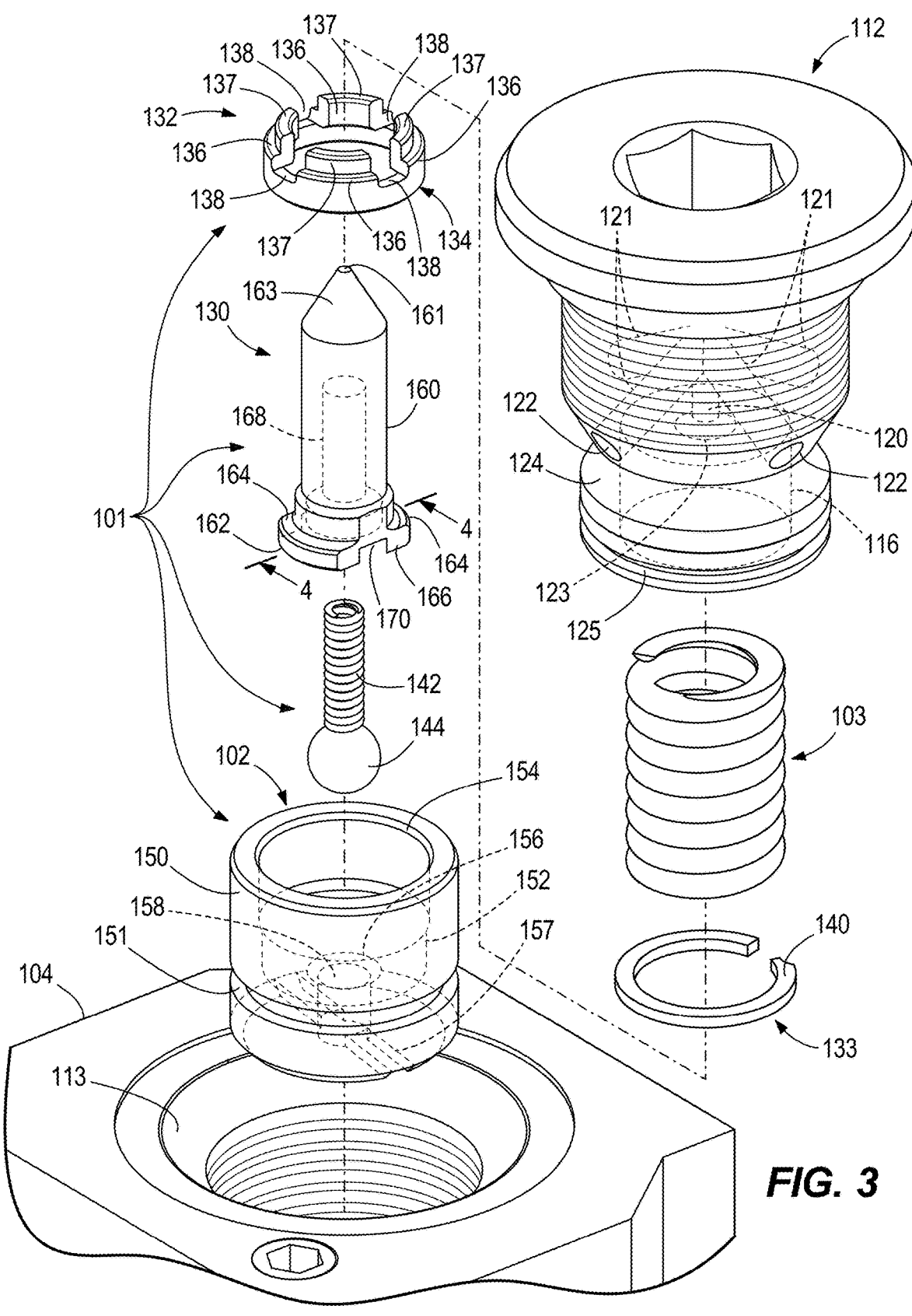
FIG. 3 is an exploded perspective view of the valve of FIG. 2.

Referring to FIGS. 1-3, the valve 100 is configured as a dump valve that provides pressurized fluid to the tool 40 when the tool 40 is operated by a user. The valve 100 is configured to automatically dump the pressurized fluid back into the tank 62 when the demand for pressurized fluid at the tool 40 ceases, for example when the user stops operating the tool 40.

The valve 100 includes a manifold 104 that houses a piston assembly 101 (see, e.g., FIG. 4) configured to move within the manifold 104 into and between operating positions of the valve 100. The manifold 104 defines an internal piston chamber 114 (FIG. 2) in which the piston assembly 101 is movably received and a plurality of conduits 107, 109, 111 that connect the piston chamber 114 to corresponding inlets and outlets 106, 108, 110. In particular, the illustrated manifold 104 includes a manifold inlet 106 fluidically connected to a manifold cavity 118, which forms a lower portion of the piston chamber 114, via an inlet conduit 107, a tank outlet 108 fluidically connected to the piston chamber 114 via a tank conduit 109, and a tool outlet 110 fluidically connected to the piston chamber 114 via a tool conduit 111. As discussed in further detail below, the manifold inlet 106 is configured to receive the pressurized fluid from the pump assembly 50 (and/or another fluid source), the tool outlet 110 is configured to discharge the pressurized fluid to the tool 40, and the tank outlet 108 is configured to discharge the pressurized fluid from the manifold 104 back to the tank 62.

Figure 4:
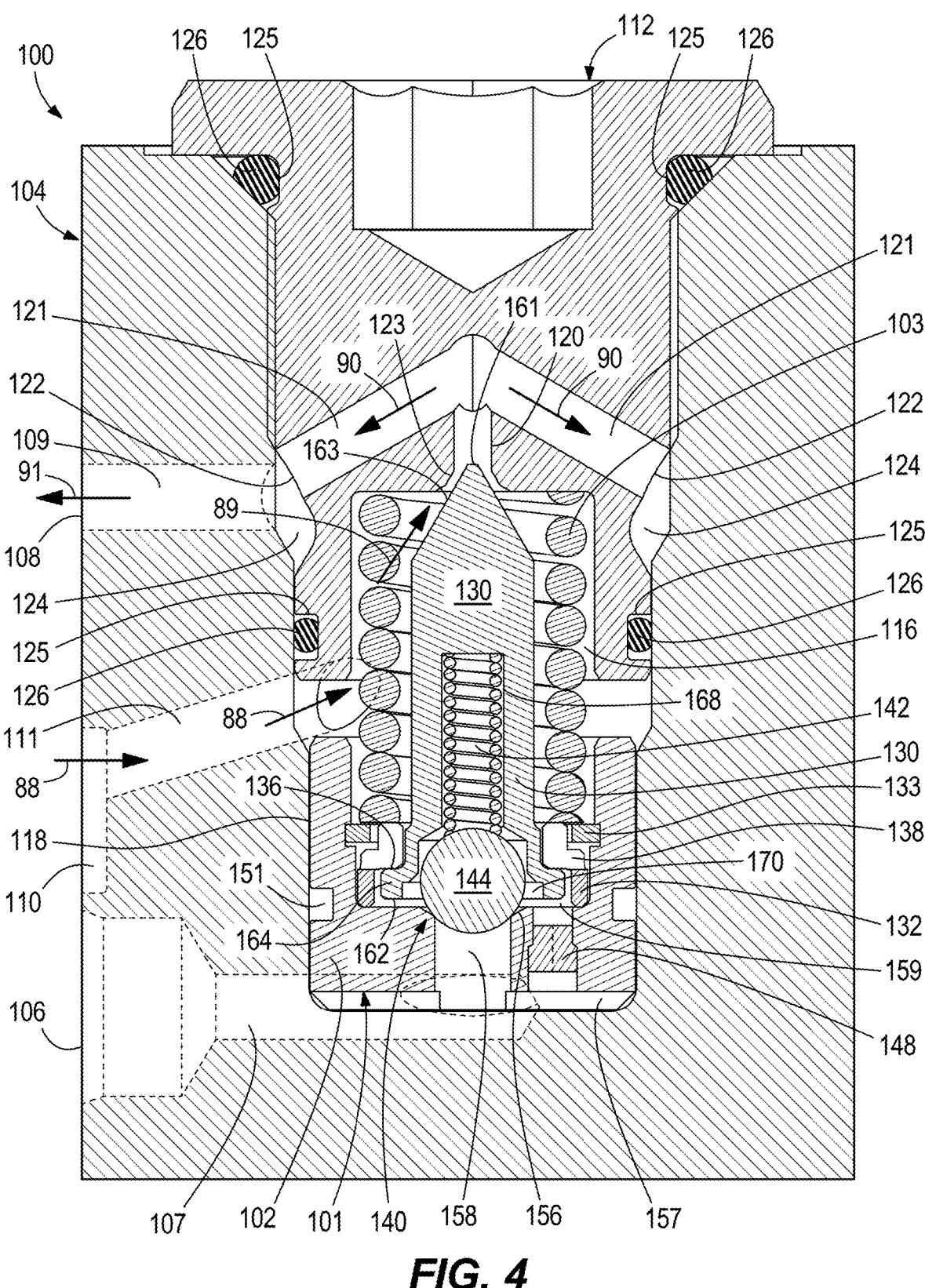
FIG. 4 is a view of section 4-4, taken in FIG. 3, showing a poppet in the unseated position and a check valve in the closed position.

Referring to FIGS. 3 and 4, the valve 100 includes a manifold plug 112 that is threadedly received in a chamber opening 113 of the body of the manifold 104 to seal and define a portion of the piston chamber 114. The manifold plug 112 includes a generally cylindrical plug cavity 116 that opens downward and forms an upper portion of the piston chamber 114. An upwardly extending vertical conduit 120 extends upwardly from a seat 123 at the top of the plug cavity 116 to fluidically connect the plug cavity 116 to a plurality of radial conduits 121. The radial conduits 121 extend radially outward from the top of the vertical conduit 120 to corresponding openings 122 formed in an outer surface of the manifold plug 112. As illustrated in FIG. 4, the openings 122 of the radial conduits 121 open into an annular channel 124 that extends circumferentially around the plug 112. The annular channel 124 allows fluid to flow out of the radial conduits 121, around the body of the plug 112, and into the tank conduit 109. Annular grooves 125 are formed around an outer surface of the plug 112 and are configured to receive an O-ring 126 and/or another seal member to form a seal between the body of the plug 112 and the body of the manifold 104.

Referring to FIGS. 3 and 4, the piston assembly 101 is configured to move axially within the piston chamber 114 in response to pressure changes at the inlets and outlets 106, 108, 110 of the manifold 104. The piston assembly 101 includes a piston 102, a poppet 130 that is at least partially received in the piston 102, a retainer 132 that operatively couples the poppet 130 to the piston 102, a retainer clip 133 configured to secure to retainer 132 in the piston 102, and a check valve 140 positioned at least partially within the piston 102 and the poppet 130. As discussed in further detail below, the piston 102 and the poppet 130 are operatively coupled to each other such that the piston 102 and poppet 130 may move together within the piston chamber 114 to move the poppet 130 between a seated position (FIGS. 5 and 6) and an unseated position (FIGS. 4 and 8) while also permitting the piston 102 to move independently from the poppet 130.

With continued reference to FIGS. 3 and 4, the piston 102 has a piston body 150 with a cylindrical piston bore 152 extending vertically into the piston body 150 from an opening 154 at the top end of the body 150. The piston bore 152 extends from the opening 154 to a seat 156 located at the bottom of the bore 152. The seat 156 forms part of the check valve 140. A vertical conduit 158 extends downwardly from the seat 156 and opens into a lateral channel 157 that extends between opposing sides of the piston body 150. As illustrated in FIGS. 2 and 4, the lateral channel 157 opens into the inlet conduit 107, thereby fluidically connecting the piston bore 152 with the manifold inlet 106 so that pressurized fluid from the pump assembly 50 can flow into the piston chamber 114 via the vertical conduit 158 in the body 150 of the piston 102. An annular groove 151 is formed around a radially outer surface of the piston body 150 and is configured to receive an O-ring and/or seal member (not shown) to form a sliding seal between the piston 102 and the interior surfaces of the manifold cavity 118. The piston 102 additionally includes an orifice 148 configured to permit leakage of the pressurized fluid between the piston chamber 114 and the inlet conduit 107. As discussed in further detail below, this may be useful to allow the poppet 130 to return to the unseated position. In the illustrated embodiments, the orifice 148 is configured as an insertable component that is received in a through bore extending through a bottom surface of the piston 102. Some embodiments, however, may be configured with an orifice that is a formed as a part of the piston body 150.

With continued reference to FIGS. 3, and 4, the poppet 130 includes a poppet body 160 that extends between a first end 161 and a second end 162. The first end 161 includes a generally conical tapered surface 163 that is configured to be seated in the seat 123 of the manifold plug 112 when the poppet 130 is in the seated position. When in the seated position, the poppet 130 prevents flow from the piston chamber 114 to the vertical conduit 120. The second end 162 of the poppet 130 includes a flange 164 configured to be operatively engaged with the piston 102 and/or the retainer 132. In the illustrated embodiments, the flange 164 includes multiple flange sections that each extend around a portion of the poppet body 160. The flange sections are diametrically opposed from each other and are separated by flat sections 166, which allow fluid flow around the exterior of the poppet 130. A poppet bore 168 is formed in the poppet body 160 and extends vertically into the poppet body 160 from the second end 162 thereof. A lateral channel 170 extends between opposing sides of the poppet body 160 such that pressurized fluid may flow through the lateral channel 170 to the flat sections 166 between the opposing portions of the flange 164.

Figure 6:
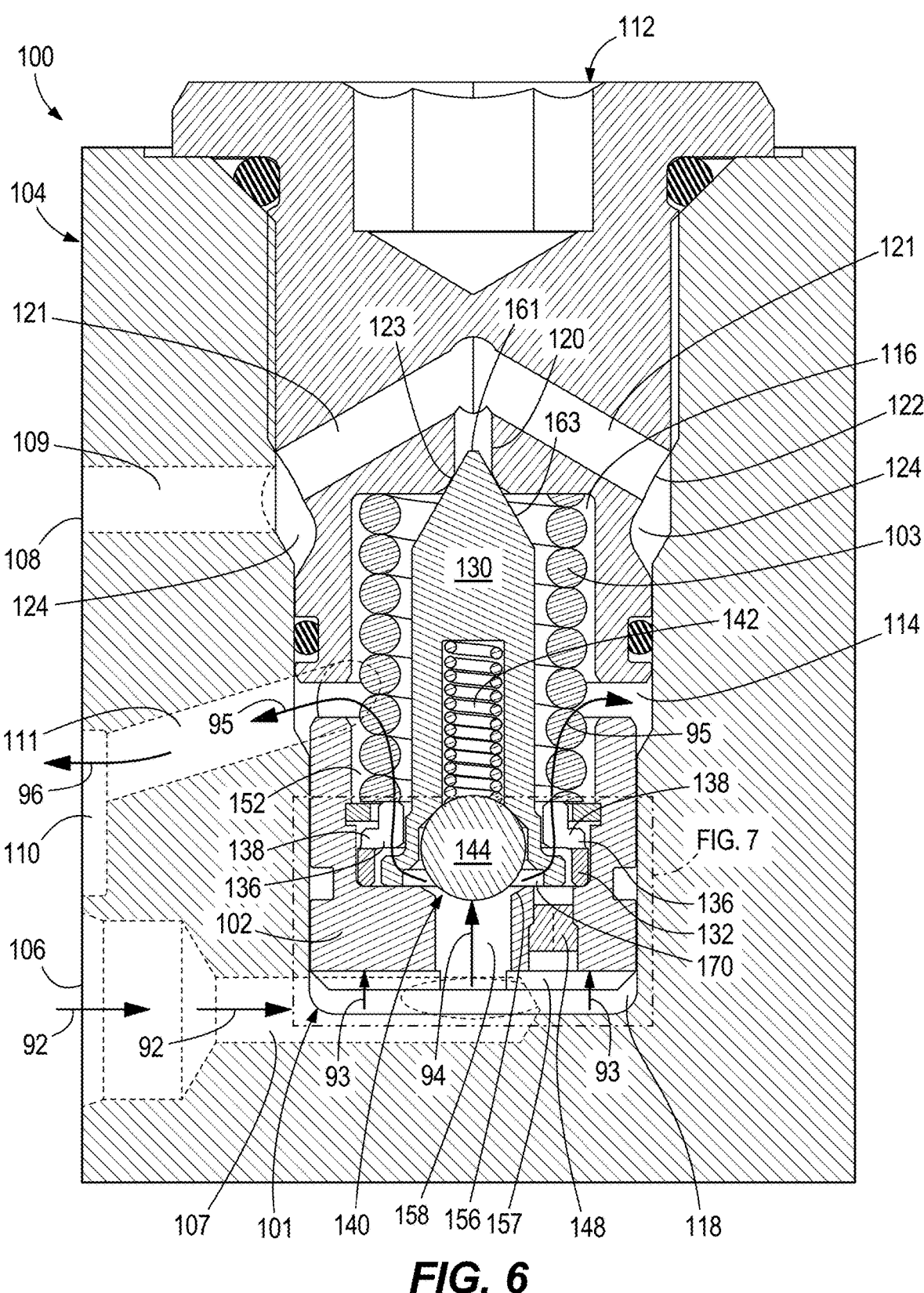
FIG. 6 is another view of section 4-4, showing the poppet in the seated position and a check valve in the open position.

With continued reference to FIGS. 3 and 4, the second end 162 of the poppet 130 extends into bore 152 in the piston 102, and the retainer 132 is positioned in the piston bore 152 above the flange 164 of the poppet 130. The retainer clip 133 is configured to engage the interior surface of the piston bore 152 above the retainer 132, thereby securing the retainer 132 in the piston bore 152. In turn, the retainer 132 retains the poppet 130 in the piston bore 152. The retainer 132 has an annular retainer body 134 with a flange 136 that extends radially inward towards the center of the retainer body 134. Vertical extensions 137 extend upwardly from the sections of the retainer flange 136 alongside the poppet body 160. The retainer flange 136 is divided into a plurality of flange sections that each extend around a portion of the radially inner surface of the annular body 134. The segments of the flange 136 are separated from each other by slots 138 that allow fluid to flow through the flange 136 and the vertical extensions 137 from an interior side of the annular retainer body 134 to an exterior side thereof. Thus, as illustrated in FIGS. 3 and 6, the slots 138 fluidically connect the space below the retainer flange 136 and the space below the poppet 130 via the flat sections 166 (FIG. 3) to the space above the retainer flange 136 and the retainer clip 133.

Figure 7:
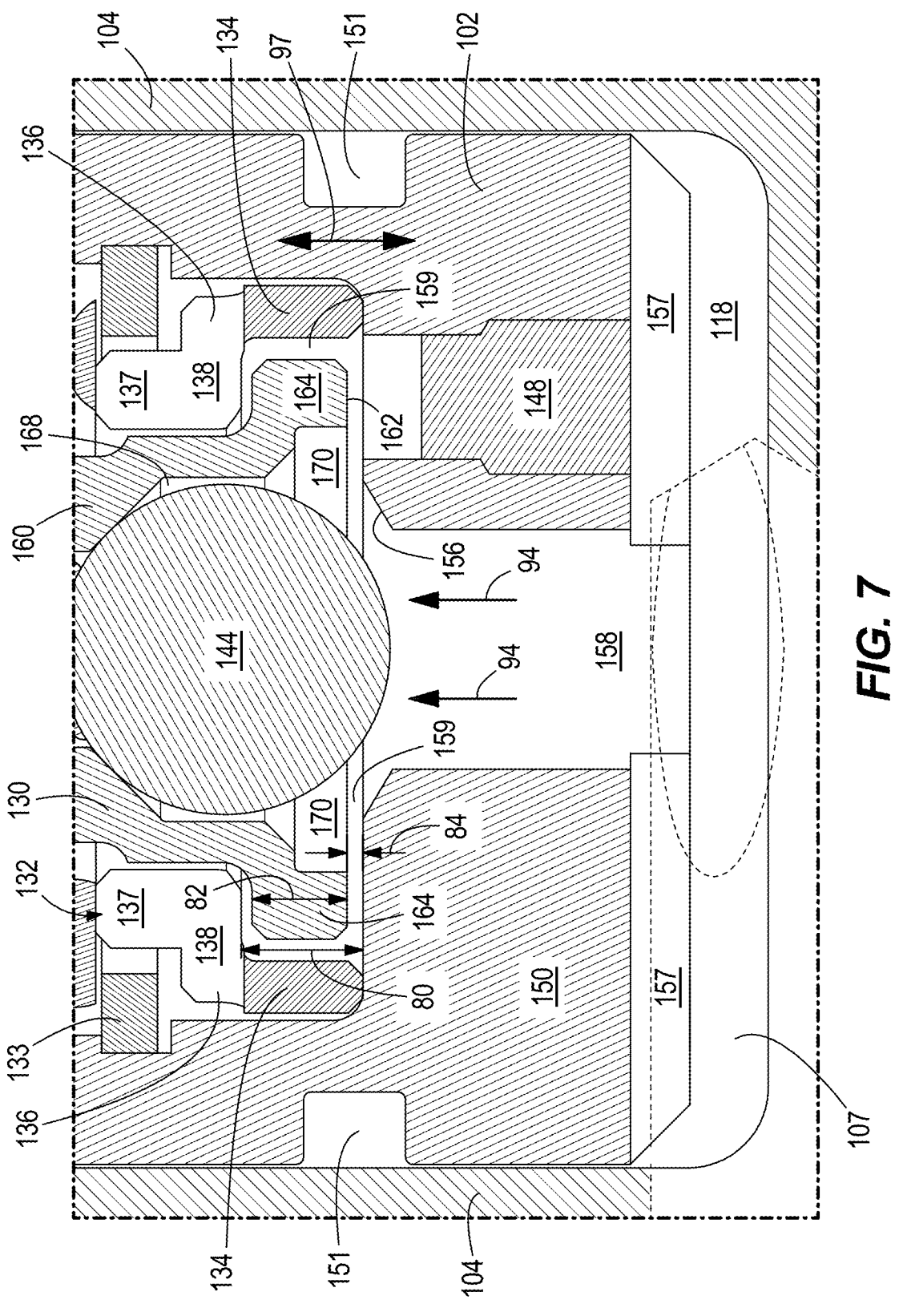
FIG. 7 is a detailed view of FIG. 6.

As illustrated in FIGS. 3 and 4, the retainer 132 surrounds the second end 162 of the poppet 130, and a slot 159 is defined between the retainer 132 and the bottom surface of the bore 152 of the piston 102. The slot 159 (FIG. 7) permits movement of the piston 102 relative to the poppet 130. For example, a poppet flange 164 and the slot 159 are movable relative to each other so that the poppet flange 164 may engage opposite ends of the slot 159 to engage the piston 102 with the poppet 130. The poppet flange 164 may move within the slot 159 due to movement of the poppet 130 relative to the piston 102 and the retainer 132, and/or due to movement of the piston 102 and the retainer 132 relative to the poppet 130. Referring to FIG. 7, the retainer 132 and the poppet 130 define a gap 84 within the slot 159 which permits independent movement of the piston 102 relative to the poppet 130. In the illustrated embodiment, a vertical dimension 80 of the annular body 134 of the retainer 132 is larger than a vertical dimension 82 of the poppet flange 164 (which defines the vertical dimension of the slot 159) so that a gap 84 provides clearance for the piston 102 and the poppet 130 to move axially relative to each other in the piston chamber 114. Thus, the poppet flange 164 can slide in a vertical direction in the gap 84. When the poppet 130 is seated, it is held in place by hydraulic pressure in chamber 114 acting on the seat 123, while the piston 102 may slide within the piston chamber 114. Thus, the slot 159 may be moved relative to the poppet flange 164 due to the movement of the piston 102 and the retainer 132. As discussed in detail below, this may be useful to maintain the poppet 130 in a seated position while allowing the piston to move in response to fluctuations in the pressure of the fluid. In the illustrated embodiments, the retainer 132 is configured as a separate piece from the piston 102 and is configured to move with the piston 102 in the manifold 104 in response to variations in the fluid pressure in the piston chamber 114 of the manifold 104.

Some embodiments, however, may be configured with a retainer that is integrally formed with the piston 102.

Referring to FIGS. 3 and 4, the illustrated check valve 140 is configured as a ball valve 140 with a ball 144 and a check valve spring 142 configured to bias the ball 144. The check valve spring 142 is disposed in the bore 168 of the poppet and is configured to bias the check valve 140 into a closed position in which the ball 144 is seated on the seat 156 on the piston 102. The check valve 140 may be moved into an open position (FIG. 6) in which pressurized fluid may flow through the check valve 140 from the inlet conduit 107 into the piston chamber 114 in the manifold 104. As illustrated in FIG. 4, the check valve spring 142 is compressed between the poppet 30 and the ball 144 so that the check valve spring 142 biases the poppet 130 and ball 144 apart from each other. Thus, the poppet 130 is biased upwards so that the poppet flange 164 abuts the lower surface of the retainer flange 136 by the spring force of the check valve spring 142. This spring force from the check valve spring 142 is an internal force acting within the piston assembly 101.

With continued reference to FIGS. 3 and 4, the valve 100 includes a piston spring 103 that is received in the piston chamber 114 and is configured to bias the piston assembly 101 towards the bottom of the manifold 104. Referring to FIG. 4, the piston spring 103 is configured as a coil spring that is positioned in the piston chamber 114 with a top end that extends into the plug cavity 116 and abuts the upper surface thereof. A bottom end of the piston spring 103 extends into the piston bore 152 and abuts at least a portion of the retainer 132, the retainer clip 133, and/or the body 150 of the piston 102. The piston spring 103 is coiled around the poppet 130 so that the piston spring 103 and the check valve spring 142 are coaxially disposed within the piston chamber 114. The piston spring 103 is configured to bias the piston 102 and the retainer 132 downwards towards the bottom end of the piston chamber 114. Because a portion of the poppet 130 and the check valve 140 are retained in the piston 102, the piston spring 103 is also configured to bias the poppet 130 downwards with the piston 102 and into the unseated position. Thus, as detailed below, the piston spring 103 is configured to bias the piston assembly 101 downward to restrict or prevent the flow of pressurized fluid through the pump valve 100 from the inlet conduit 107 to the tank conduit 108.

To assemble the valve 100 (see, e.g., FIG. 4), the piston assembly 101 may be pre-assembled before being inserted into the manifold 104. In the illustrated embodiment, for example, the check valve spring 142 is inserted into the bore 168 in the poppet 130 before the poppet 130 and check valve are lowered into the bore 152 in the piston 102 such that the ball 144 of the check valve 140 contacts the seat 156 at the lower end of the piston bore 152. The retainer 132 is then lowered onto the poppet 130 and into the piston bore 152 such that the annular body 134 of the retainer surrounds the second end 162 of the poppet 130. The retainer clip 133 is then pressed downwards into the piston bore 152 until it engages a groove formed in a radially inward facing surface of the piston bore 152, thereby securing the retainer clip 133 in the piston bore 152. In turn, the retainer clip 133 retains the retainer 132 in the piston bore 152, and the retainer 132 retains the second end 162 of the poppet 130 in the piston bore 152 with the poppet flange 164 in the slot 159 between the retainer flange 136 and the bottom surface of the piston bore 152. Advantageously, the retainer clip 133 prevents the check valve spring from pushing the poppet 130 upwards and out of position in the piston bore 152 during assembly.

After the piston assembly 101 has been pre-assembled, the piston assembly 101 is lowered into the piston chamber 114 of the manifold 104 via the chamber opening 113 at the top end of the body of manifold 104. The piston spring 103 is then lowered onto the poppet 130 such that the bottom end of the piston spring 103 enters the piston bore 152 and contacts the retainer 132, the retainer clip 133, and/or the piston body 150. The piston chamber 114 can then be sealed by lowering the manifold plug 112 into the piston chamber 114 via the chamber opening 113. When the manifold plug 112 is inserted via the opening 113, the first end 161 of the poppet 130 and the top end of the piston spring 103 enter the cavity 116 in the plug 112. The threads of the plug 112 are then engaged with the threads on the manifold 104 to secure the plug on the body of the manifold 104.

In operation, embodiments of the novel flow control valve 100 are configured to maintain a seal between the poppet 130 and the seat 123 in the manifold plug 112 to prevent pressurized fluid from leaking to the tank 62 while pressurized fluid is conveyed through the valve to operate the tool 40 and/or other output device(s). When operation of the tool 40 ceases, the poppet 130 disengages from the seat 123 in the manifold plug 112 to automatically dump pressurized fluid from the tool 40 and the manifold 104 back to the fluid tank 62.

Referring to FIG. 4, the valve 100 is shown with the piston assembly 101 in a resting position in which pressurized fluid is not being pumped into the valve 100 from the pump assembly 50. In the resting position of the valve 100, the check valve 140 is biased by the check valve spring 142 into in a closed position in which the ball 144 pressed against the seat 156 of the piston 102. The poppet 130 is also biased by the piston spring 103 (via abutment with the retainer 132 and/or piston 102) into the unseated position in which the tapered surface 163 at the first end 161 of the poppet 130 is disengaged from the seat 123 in the manifold plug 112. The illustrated piston spring 103 biases the piston 102 and retainer 132 downward, and abutment between the retainer flange 136 and the poppet flange 164 causes the retainer 132 and/or the piston 102 to bias the poppet 130 into the unseated position.

With the poppet 130 in the unseated position and the check valve 140 in the closed position, the valve 100 provides a pathway for pressurized fluid from the tool 40 to flow through the manifold 104 and to the fluid tank 62 via the tank outlet 108. In FIG. 4, for example, fluid from the tool 40 may enter the manifold 104 via the tool outlet 110 and flow into the piston chamber 114 via the tool conduit 111, for example along the paths indicated by arrows 88. Once in the piston chamber 114, the pressurized fluid flows around the poppet 130 and upwards towards the upper surface of the plug cavity 116, for example in the direction of arrow 89. Pressurized fluid is prevented from flowing out from the manifold 104 via the manifold inlet 106 by the check valve 140, which is in the closed position. The pressurized fluid continues to flow upwards through the vertical conduit 120 in the manifold plug 112 and into at least one of the radial conduits 121. Pressurized fluid then flows through the radial conduits 121, for example in the direction of arrows 90, and into the annular channel 124 formed around the body of the plug 112. The pressurized fluid flows through the annular channel 124 and into the tank conduit 109, which conveys the pressurized fluid to the tank outlet 108 where the fluid exits the manifold 104, for example in the direction of arrow 91, and flows back into the pump assembly 50 towards the tank 62.

Figure 5:
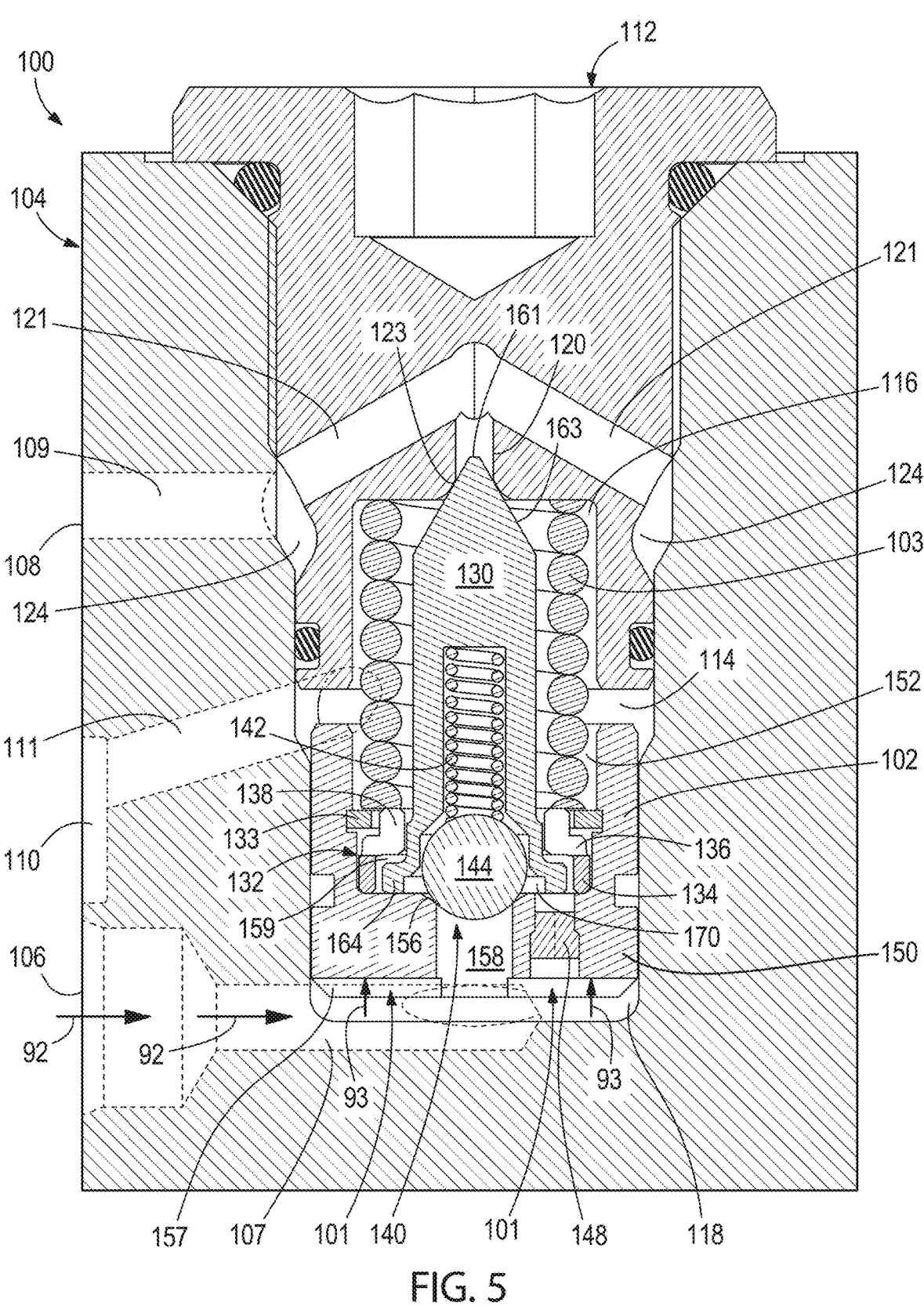
FIG. 5 is another view of section 4-4, showing the poppet in the seated position and the check valve in the closed position.

When the pump 51 of the pump assembly 50 is activated, pressurized fluid is pumped into the valve 100 via the manifold inlet 106. Referring to FIG. 5, pressurized fluid from the pump 51 flows into the manifold 104 and into the inlet conduit 107 via the manifold inlet 106, for example in the direction of arrows 92. As the pressurized fluid is pumped into the manifold 104, the fluid pressure in the inlet conduit 107 and the manifold cavity 118 below the piston assembly 101 increases and approaches a first pressure level. The pressurized fluid applies a force on the body 150 of the piston 102, thereby forcing the piston 102 upwards within the piston chamber, for example in the direction of arrows 93. The check valve spring 142 provides a spring force that is sufficient to prevent the check valve 140 from opening at the first pressure level. As the piston 102 moves upwards, it pushes the poppet 130 upwards (e.g., via a reaction force transmitted through the ball 144 and check valve spring 142) such that the piston 102, poppet 130 and retainer 132 (i.e., the piston assembly 101 as a whole) move together.

With continued reference to FIG. 5, upwards movement of the piston assembly 101 is opposed by the piston spring 103, which is configured to bias the piston assembly 101 downward. The continued inflow of pressurized fluid through the manifold inlet 106 continues to increase the pressure below the piston 102, further compressing the piston spring 103 and moving the piston 102 and poppet 130 upwards. Once the pressurized fluid flowing into the manifold 104 reaches the first fluid pressure level, the piston spring 103 will be compressed enough that the first end 161 of the poppet 130 engages the seat 123 in the manifold plug 112, thereby placing the poppet 130 in the seated position and closing the tank outlet 108 so that the pressurized fluid is prevented from flowing out from the manifold 104 via the tank outlet 108. The fluid pressure level required to move the poppet 130 into the seated position may be tuned, for example, by tuning the properties of the piston spring 103 (e.g., spring stiffness, spring size, etc.). Thus, when the pressurized fluid flows into the manifold 104 via the manifold inlet 106 at the first fluid pressure level, the piston 102 pushes the poppet 130 into the seated position.

As previously mentioned, the slot 159 (FIG. 7) defined between the retainer 132 and piston 102 provides clearance for the poppet flange 164 to move vertically in the gap 84 between the poppet flange 164 and the top and bottom ends of the slot 159 (i.e., between the retainer flange 136 and the bottom surface of the piston bore 152). Because the slot 159 is defined by the body 150 of the piston 102 and the retainer 132, movement of the piston 102 and the retainer 132 relative to the poppet 130 moves the slot 159 relative to the poppet flange 164. Once the poppet 130 is in the seated position, the piston 102 may continue to move upwards alongside the poppet 130 until the poppet flange 164 abuts the piston 102, thereby placing the piston 102 and the piston assembly 101 in the fully extended position (FIG. 5). In this position, the piston spring 103 applies a force on the piston 102, thereby biasing the piston 102 away from the poppet 130 when the poppet 130 is in the seated position.

Because the ball 144 of the check valve 140 is held in the seat 156 of the piston 102 by the internal force created by the check valve spring 142, the check valve 140 will remain in the closed position while the pressurized fluid is at the first fluid pressure level. When the piston 102 reaches the fully extended position, the force provided by the pressurized fluid at the first pressure level is required to maintain the piston in the fully extended position. To open the check valve 140, the fluid pressure at the manifold inlet 106 is increased to a second pressure level that is greater than the first pressure level.

Referring to FIG. 6, when at the second pressure level, the pressurized fluid applies an increase pressure force on the piston assembly 101, and the increased pressure force acts on the ball 144 to push it upwards out of the seat 156 on the piston 102 and into the bore 168 in the poppet 130. Thus, the check valve 140 is moved into the open position when pressurized fluid flows into the manifold 104 via the manifold inlet 106 at the second fluid pressure level. Pressurized fluid from the manifold inlet 106 may flow out from the manifold 104 via the tool outlet 110 when the check valve 140 is in the open position. After the check valve 140 is moved into the open position, the ball 144 is held in the poppet bore 168 apart from the seat 156 by the pressure force from the pressurized fluid against the spring force of the check valve spring 142. If the fluid pressure at the inlet conduit 107 drops below the second fluid pressure level, the check valve spring 142 may bias the ball 144 back towards the poppet seat 156, thereby sealing the check valve 140.

With continued reference to FIG. 6, pressurized fluid that has entered the inlet conduit 107 in the direction of arrows 92 can flow upwards into the piston assembly 101 via the vertical conduit 158 in the body 150 of the piston 102 and, for example in the direction of arrow 94. The pressurized fluid then flows around the poppet 130 via the lateral channel 170 in the poppet body 160 and at least one of the flat sections 166 (see FIG. 3) that separate the sections of the poppet flange 164. The pressurized fluid then continues to flow though the retainer 132 via at least one of the slots 138 formed through the retainer flange 136, for example along a path indicated by arrows 95. Once on the outer side of the retainer 132, pressurized fluid flows around the piston assembly 101 in the piston chamber 114, into the tool conduit 111 and out of the manifold 104 via the tool outlet 110.

As previously mentioned, the pressure of the fluid provided at the manifold inlet 106 may fluctuate as the pump piston(s) 54, 56 move through their piston cycles. In the illustrated embodiment, for example, the first and second pump pistons 54, 56 initially provide a continuous but variable flow of pressurized fluid into the pump valve 100 via the inlet opening 107. Once the initial fluid pressure in the pump assembly 50 is reached and the pressure form the first piston 54 is dumped back to the tank 62, the second pump piston 56 continues to provide variable, intermittent flow of pressurized fluid into the pump valve 100.

To maintain a seal between the poppet 130 and the seat 123, the piston 102 is independently movable relative to the poppet 130 so that the poppet 130 may remain in the seated position upon said pressure fluctuations. Referring to FIG. 7, the piston 102 and the retainer 132, which is coupled to the piston 102 by the retainer clip 133, can move axially within the piston chamber 114 in response to pressure fluctuations. When the poppet 130 is in the seated position and the pressurized fluid in the manifold 104 is reduced below the second fluid pressure level, the check valve spring 142 biases the check valve 140 back into the sealed position, thereby preventing the flow of pressurized fluid through the vertical conduit 158 in the piston 102. In this position, the orifice 148 allows pressurized fluid to flow through body 150 of the piston 102 so that the pressures of the fluid above the piston 102 and the fluid below the piston 102 can equalize. By allowing the pressures above and below the piston 102 to equalize, the orifice 148 allows the piston to move relative to the poppet 130 as the flow of pressurized fluid from the pump assembly 50 fluctuates.

When the poppet 130 is in the seated position and the pressurized fluid in the manifold 104 is reduced below the first fluid pressure, the piston spring 103 moves the piston 102 and retainer 132 downward alongside the poppet 130 such that the slot 159 between the piston 102 and the retainer flange 136 is moved relative to the poppet flange 164. Advantageously, this allows the poppet 130 to remain in the seated position to seal the tank outlet 108 as the piston 102 reciprocates within the piston chamber 114 in response to pressure fluctuations. The possible range of movement of the piston 102 relative to the poppet 130 is defined by the size of the gap 84 between the upper and lower surfaces of the slot 159 and the poppet flange 164.

Figure 8:
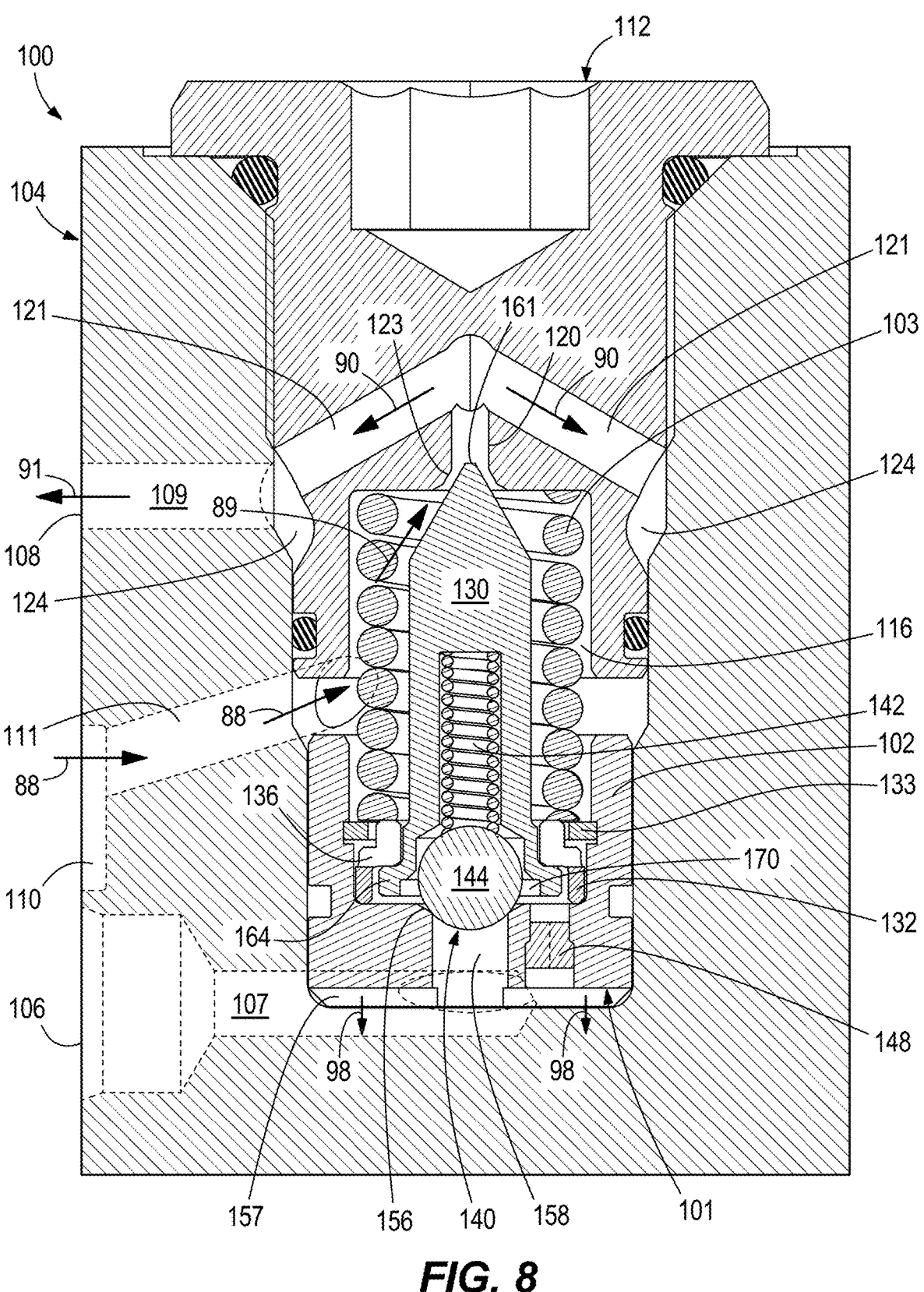
FIG. 8 is another view of section 4-4, showing the check valve in the closed position and the poppet returning to the unseated position.

If the pressure of the fluid in the manifold 104 continues to drop below the first fluid pressure level, for example when operation of the tool 40 (and therefore the pump 51) ceases, the piston spring 103 will continue to move the piston 102 alongside the poppet 130 until the piston 102 and/or the retainer 132 move into engagement with the flange 164 of the poppet 130. The fluid pressure above and below the body 150 of the piston 102 is allowed to equalize by the orifice 148, which allows pressurized fluid to leak between the piston chamber 114 and the inlet conduit 107. Referring to FIG. 8, once the poppet flange 164 engages the lower surface of the retainer flange 136, the piston spring 103 pushes the piston 102 and the poppet 130 downwards in the piston chamber 114. Thus, the piston spring 103 moves the poppet 130 out of the seated position in which the first end 161 is engaged with the seat 123 and into the unseated position, for example in the direction of arrows 98. Once the poppet 130 is unseated, pressurized fluid in from the tool 40 (via the tool outlet 110) and in the piston chamber 114 flows out of the manifold via the tank outlet 108, for example in the direction of arrows 88, 89, 90, 91.

In the illustrated embodiments, the novel pump valve 100 is depicted in an orientation such that the piston assembly 101 slides axially within the piston chamber 114 in a vertical direction. (i.e., upward and downward movement). It should be appreciated that embodiments of the pump valve 100 may be used in a different orientation. For example, the pump valve 100 may be orientated such that the piston assembly 101 slides axially within the piston chamber 114 in a horizontal direction. (i.e., movement to the left and right), and/or in any other orientation of the pump valve 100.

In the present description, certain terms have been used for brevity, clarity, and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A valve for controlling flow of a pressurized fluid to a tool, the valve comprising:
   a manifold having:
      a manifold inlet configured to receive the pressurized fluid from a source;
      a tool outlet configured to discharge the pressurized fluid to the tool; and
      a tank outlet configured to discharge the pressurized fluid to a tank;
   a poppet biased into an unseated position in which the pressurized fluid may flow from the manifold via the tank outlet, the poppet being movable into a seated position in which the pressurized fluid is prevented from flowing from the manifold via the tank outlet;
   a piston configured to move the poppet into the seated position when the pressurized fluid flows into the manifold via the manifold inlet at a first fluid pressure; and
   a check valve biased into a closed position in which the pressurized fluid is prevented from flowing from the manifold via the tool outlet, the check valve being movable into an open position in which the pressurized fluid may flow from the manifold via the tool outlet when the pressurized fluid flows into the manifold via the manifold inlet at a second fluid pressure which is greater than the first fluid pressure;
   wherein the piston and poppet are coupled together so that when the poppet is in the seated position, the piston is independently movable relative to the poppet so that the poppet may remain in the seated position upon variations in fluid pressure in the manifold.

2. The valve according to claim 1, comprising a retainer configured to retain the poppet relative to the piston so that the poppet remains in the seated position upon said variations in fluid pressure in the manifold.

3. The valve according to claim 2, wherein the retainer is disposed in or part of the piston.

4. The valve according to claim 2, wherein the retainer is a separate piece from the piston and configured to move with the piston in the manifold upon said variations in fluid pressure in the manifold.

5. The valve according to claim 2, wherein at least one of the retainer and the poppet define a gap which permits independent movement of the piston relative to the poppet.

6. The valve according to claim 2, wherein the poppet comprises a flange which is slidable back and forth in a gap between the poppet and the retainer.

7. The valve according to claim 2, wherein the poppet comprises a body having a first end configured, in the seated position, to seat in a seat on the manifold and a second end operably engaged with the retainer, wherein engagement between the first end and the seat forms a seal.

8. The valve according to claim 7, wherein the retainer surrounds the second end of the poppet and further wherein a slot is defined between the retainer and the piston which permits movement of the piston relative to the poppet.

9. The valve according to claim 1, comprising a piston spring biasing the poppet into the unseated position.

10. The valve according to claim 9, wherein the piston spring biases the piston away from the poppet when the poppet is in the seated position.

11. The valve according to claim 10, configured so that when the pressurized fluid flows into the manifold at the first fluid pressure, the piston is moved with the poppet as the poppet moves into the seated position.

12. The valve according to claim 10, configured so that when the poppet is in the seated position and the pressurized fluid in the manifold is reduced below the first fluid pressure, the piston spring moves the piston back alongside the poppet and then into engagement with the poppet.

13. The valve according to claim 12, comprising a flange and a slot which are movable relative to each other, the flange engaging opposite ends of the slot to engage the piston with the poppet.

14. The valve according to claim 1, comprising a check valve spring biasing the check valve into the closed position.

15. The valve according to claim 1, wherein the check valve comprises a ball valve.

16. The valve according to claim 1, comprising a piston spring biasing the poppet into the unseated position, a check valve spring biasing the check valve into the closed position, wherein the piston spring and the check valve spring are coaxial.

17. The valve according to claim 16, wherein the check valve spring is disposed in the poppet.

18. The valve according to claim 16, wherein the check valve comprises a ball valve which in the closed position engages a seat in the piston.

19. The valve according to claim 1, further comprising an orifice permitting leakage of the pressurized fluid from the manifold.

20. A valve for controlling flow of a pressurized fluid to a tool, the valve comprising:

a manifold having:

a manifold inlet configured to receive the pressurized fluid from a source;

a tool outlet configured to discharge the pressurized fluid to the tool; and a tank outlet configured to discharge the pressurized fluid to a tank;

a poppet biased into an unseated position in which the pressurized fluid may flow from the manifold via the tank outlet, the poppet being movable into a seated position closing the tank outlet so that the pressurized fluid is prevented from flowing from the manifold via the tank outlet;

a piston configured to move the poppet into the seated position when the pressurized fluid flows into the manifold via the manifold inlet at a first fluid pressure, wherein the poppet extends into the piston; and a check valve on the poppet, the check valve being biased into a closed position closing the manifold inlet so that the pressurized fluid is prevented from flowing from the manifold via the tool outlet, the check valve being movable into an open position in which the pressurized fluid may flow from the manifold via the tool outlet when the pressurized fluid flows into the manifold via the manifold inlet at a second fluid pressure which is greater than the first fluid pressure;

wherein the piston and poppet are coupled together so that when the poppet is in the seated position, the piston is independently movable relative to the poppet so that the poppet may remain in the seated position upon variations in fluid pressure in the manifold.

* * * * *